US009694780B1

(12) United States Patent
Lowe et al.

(10) Patent No.: US 9,694,780 B1
(45) Date of Patent: Jul. 4, 2017

(54) AIRBAG COVER WITH BREAKAWAY-RESISTANT FEATURES (71) Applicant: Autoliv ASP, Inc., Ogden, UT (US)

(72) Inventors: William Gregory Lowe, North Ogden, UT (US); Casey Brent Brewer, Clearfield, UT (US); Claudia Ivonne Andrade Cruz, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/072,446

(22) Filed: Mar. 17, 2016

(51) Int. Cl.
*B60R 21/215* (2011.01)
*B60R 21/2165* (2011.01)
*B60R 21/203* (2006.01)
*B60R 21/2342* (2011.01)

(52) U.S. Cl.
CPC .... *B60R 21/21656* (2013.01); *B60R 21/2035* (2013.01); *B60R 21/2342* (2013.01); *B60R 2021/21537* (2013.01)

(58) Field of Classification Search
CPC .......... B60R 21/21656; B60R 21/2342; B60R 21/21537
See application file for complete search history.

(56) References Cited

U.S. PATENT DOCUMENTS

| 4,903,986 | A | | 2/1990 | Cok et al. |
| 5,306,040 | A | | 4/1994 | Leonelli et al. |
| 5,383,681 | A | * | 1/1995 | Sato ................. B60R 21/21656 280/728.3 |
| 5,433,473 | A | * | 7/1995 | Hiramitsu ......... B60R 21/21656 280/728.3 |
| 5,456,487 | A | * | 10/1995 | Daris .................. B60R 21/2165 280/728.3 |
| 5,478,105 | A | * | 12/1995 | Yamakawa ......... B60R 21/2165 280/728.3 |
| 6,179,325 | B1 | * | 1/2001 | Igawa ............... B60R 21/21658 200/61.54 |
| 6,502,852 | B2 | * | 1/2003 | Kassman ............ B60R 21/2165 280/728.3 |
| 6,581,958 | B2 | | 6/2003 | Holtz |
| 6,846,006 | B2 | * | 1/2005 | Okuda .................. B60R 21/205 280/728.3 |

(Continued)

OTHER PUBLICATIONS

U.S. Appl. No. 14/566,564, filed Dec. 10, 2014.

(Continued)

*Primary Examiner* — James A English
(74) *Attorney, Agent, or Firm* — Stoel Rives LLP (57) ABSTRACT

An airbag cover can include a sidewall to couple the airbag cover with a housing of an airbag assembly. The airbag cover can further include a panel adjoined to the sidewall at a hinge, and the panel can cover at least a portion of an opening defined by the housing through which an airbag positioned in the housing is deployable when the airbag cover is coupled to the housing. The airbag cover can include one or more tear seams that are breakable by the airbag as the airbag is deployed to form at least a portion of the panel into a door that rotates about the hinge to permit egress of the airbag. The airbag cover can further include a stress-relief region in the sidewall that is laterally adjacent to the hinge, and the stress-relief region can flex as the door rotates about the hinge to inhibit the door from separating from the sidewall during deployment of the airbag.

24 Claims, 12 Drawing Sheets (56) References Cited

U.S. PATENT DOCUMENTS

| | | | |
|---|---|---|---|
| 7,213,832 B2* | 5/2007 | Hayashi | B60R 21/2165 280/728.3 |
| 7,828,323 B1 | 11/2010 | Mazzocchi et al. | |
| 8,491,002 B2 | 7/2013 | Schneider et al. | |
| 2007/0200318 A1* | 8/2007 | Kamiya | B60R 21/2165 280/728.3 |
| 2008/0296874 A1 | 12/2008 | Kanno | |
| 2009/0058055 A1* | 3/2009 | Fujimori | B60R 21/21656 280/731 |
| 2010/0109299 A1* | 5/2010 | Hayashi | B60R 21/21656 280/728.3 |
| 2015/0123384 A1* | 5/2015 | Kwon | B60R 21/21656 280/728.3 |

OTHER PUBLICATIONS

Office Action mailed Nov. 23, 2015, in U.S. Appl. No. 14/566,564, filed Dec. 10, 2014.

Notice of Allowance mailed Mar. 23, 2016, in U.S. Appl. No. 14/566,564, filed. Dec. 10, 2014.

* cited by examiner

FIG. 11

AIRBAG COVER WITH BREAKAWAY-RESISTANT FEATURES

BACKGROUND

Inflatable airbags may be mounted within a vehicle and deployed during a collision event. The deployed airbag may cushion an occupant and prevent detrimental impact with other vehicular structures. Airbag covers can hide and/or contain the airbags when the airbags are in an un-deployed state. Some airbag covers suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

As will be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

Inflatable airbag systems are widely used to reduce or minimize occupant injury during a collision event. Airbag modules have been installed at various locations within a vehicle, including, but not limited to, the steering wheel, the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a driver airbag (DAB) that is typically housed within a steering wheel assembly, although the principles discussed may apply to other types of airbags (e.g., passenger airbags, knee airbags, side airbags).

Front airbags, generally, are often installed in a steering wheel assembly and/or in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to extend outward from the housing. The inflator may be triggered by any suitable device or system, and the triggering may be in response to and/or influenced by one or more vehicle sensors.

Certain embodiments of airbag assemblies that are disclosed herein are particularly well suited for use as driver airbag assemblies, and may be mounted in a steering wheel. Disclosures provided herein in the context of driver airbag assemblies, however, should not be construed as limiting, as other or further embodiments can be used with other suitable airbag assemblies. For example, some embodiments are suitable for use in passenger airbag assemblies. Further embodiments may be used in any other airbag assembly that includes a cover suitable for use in the manners disclosed herein.

Embodiments of the airbag assemblies can include airbag covers that are configured to behave in manners that are advantageous relative to known airbag covers. For example, some known cover arrangements are vulnerable to undesirable tearing. In some instances, airbag cover tear seams tend to tear further than desired, such as in areas of high stress. In some instances, undesired tearing tends to propagate along an adjoining line between a panel portion and a sidewall portion of the airbag cover, and may undesirably continue through a hinge region that is located along the adjoining. A door portion of the panel can be attached to the sidewall at the hinge region and can rotate about the hinge region during deployment. Such tearing along the adjoining line and through the hinge region can allow the door portion of the airbag cover to become detached from the rest of the airbag cover. This condition may be referred to herein as breakaway of the door portion.

Various embodiments disclosed herein can address, ameliorate, or eliminate the foregoing disadvantage and/or other disadvantages of known airbag assemblies. For example, certain breakaway-resistant features are disclosed herein. One or more of the advantages of various embodiments described below will be evident from the present disclosure.

Figure 1A:
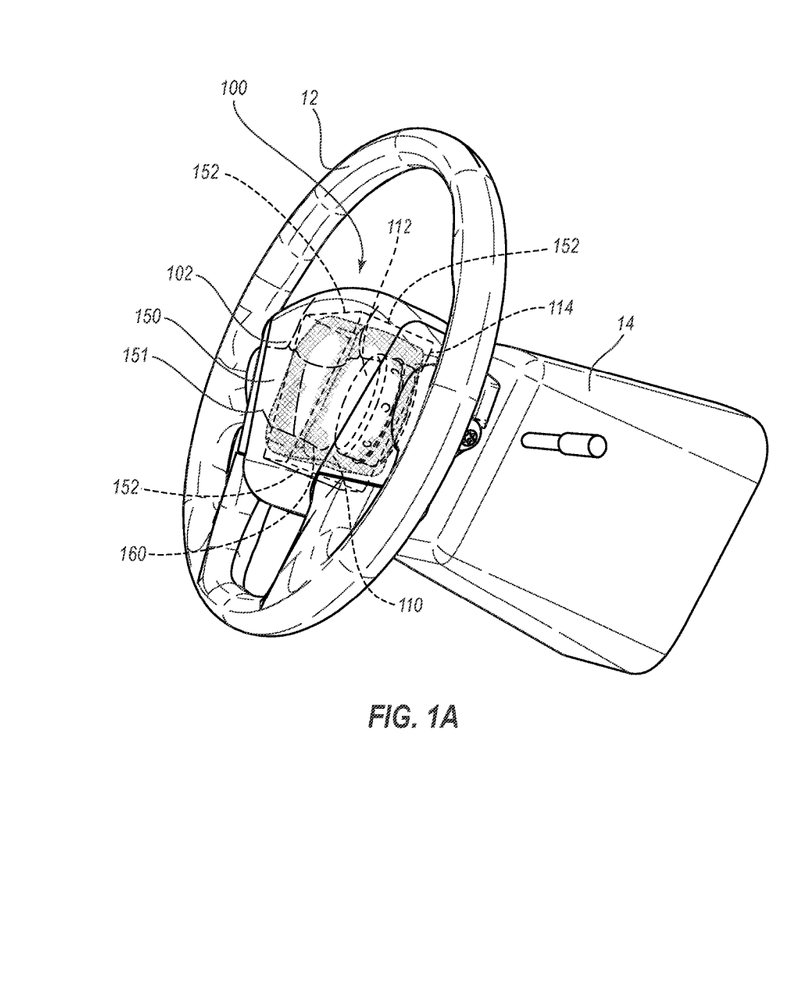
FIG. 1A is a perspective view of an embodiment of an airbag assembly mounted in a vehicle, wherein an embodiment of an airbag is shown in a packaged or undeployed state and an embodiment of an airbag cover is also in an undeployed or unbroken state.
Figure 1B:
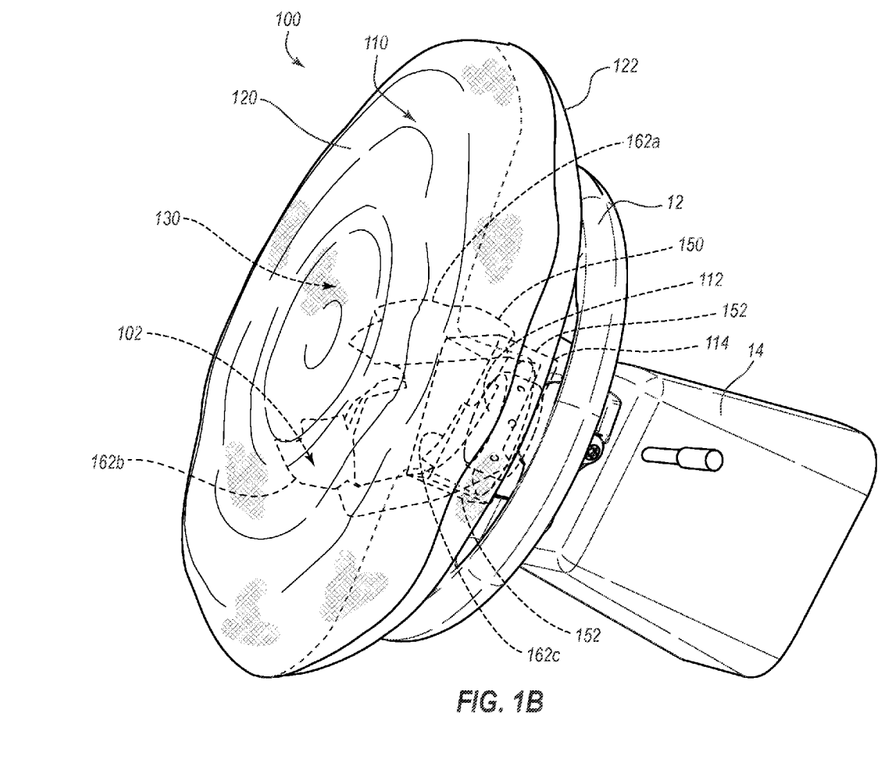
FIG. 1B is another perspective view of the airbag assembly of FIG. 1A showing the airbag and the airbag cover in deployed states.

FIGS. 1A and 1B are perspective views of an embodiment of an airbag assembly 100 mounted in a steering wheel 12 of a vehicle. The steering column 14 of the vehicle is also depicted. FIGS. 1A and 1B depict the airbag assembly 100 in two different configurations. FIG. 1A depicts the airbag assembly 100 in a packaged configuration, and FIG. 1B depicts the airbag assembly 100 in a deployed and inflated configuration.

The airbag assembly 100 may include an airbag cover 102, an inflatable airbag 110, an inflator 112, and a housing 114. The inflator 112 is in fluid communication with the airbag 110 and is configured to be actuated to generate inflation gas to expand the airbag 110. The inflator 112 is coupled to the housing 114, which is mounted to the vehicle, such as in the steering wheel 12 as illustrated. The airbag cover 102 is configured to engage or couple to the housing 114 to enclose and/or cover the unexpanded airbag 110 prior to deployment.

In the illustrated embodiment, as shown in FIG. 1B, the airbag 110 includes a cushioning panel 120. The cushioning panel 120, when the airbag 110 is in the deployed and inflated configuration, is generally directed toward an occupant or an occupant position (e.g., a vehicle seat), and may at least partially define a cabin side of the airbag 110. A base panel 122 is located opposite the cushioning panel 120. In the illustrated embodiment, the base panel 122 is adjacent to the steering wheel 12 when the airbag 110 is in the deployed and inflated configuration. The cushioning panel 120 and the base panel 122 may also be referred to as a rear panel 120 and a front panel 122, respectively, in view of the relative positions of these panels within the vehicle when the airbag 110 is deployed. The base panel 122 and the cushioning panel 120 cooperate to define an inflatable chamber 130. The panels 120, 122 may also be referred to as airbag cushion membranes, and may be formed of any suitable material. For example, in some embodiments, the panels 120, 122 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

With continued reference to FIGS. 1A and 1B, the airbag cover 102 can include a panel 150 and one or more sidewalls 152 adjoined to the panel 150. The airbag cover 102 can be formed in any suitable manner. In the illustrated embodiment, a unitary molded piece of material (e.g., plastic) forms the panel 150 and the sidewall 152. In other embodiments, a unitary molded piece of material (e.g., plastic) forms at least a portion of each of the panel 150 and the sidewall 152. The panel 150 may include an exterior surface or face 151 (see also FIG. 2) that is configured to face toward an occupant of a vehicle when the airbag cover 102 is disposed over an airbag assembly mounted in a vehicle. The exterior face 151 of the panel 150 may define an "A" surface of the airbag assembly 100. The airbag cover 102, and in certain embodiments the panel 150 in particular, is configured to open during deployment of the airbag 110. For instance, actuation of the inflator 112 may rapidly inflate the airbag 110, which can force the airbag cover 102 to burst or tear open to permit egress of the airbag 110 toward the vehicle occupant, as further discussed below.

Figure 2:
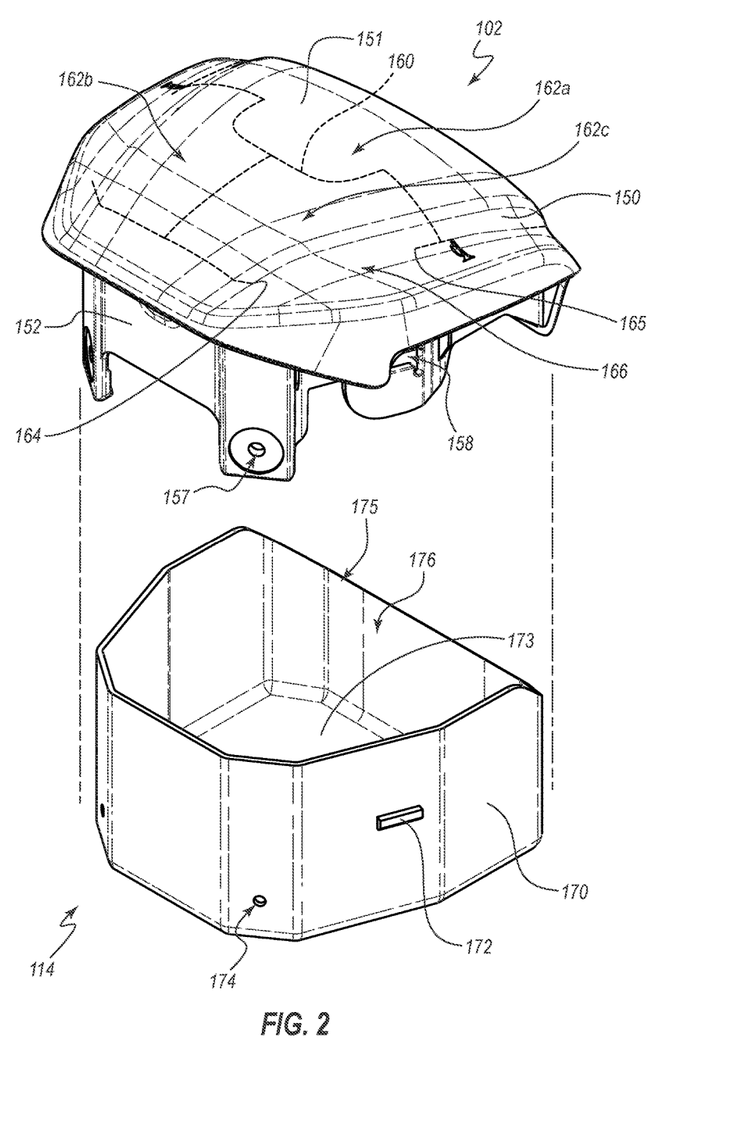
FIG. 2 is an exploded perspective view of the airbag cover showing an external surface thereof and an embodiment of a housing to which the airbag cover is configured to be attached.

To facilitate opening of the airbag cover 102, the airbag cover 102 may include one or more frangible or breakable tear seams 160 (shown more clearly in FIG. 2). The one or more tear seams 160 can be configured to break, rip, tear, and/or otherwise separate upon expansion of the airbag 110. The one or more tear seams 160 may be configured to form at least a portion of the panel 150 into one or more doors 162a, 162b, 162c that open during deployment of the airbag 110. In the illustrated embodiment, the one or more tear seams 160 are configured to break in a pattern that forms the panel 150 into three doors 162a, 162b, 162c. From the perspective of the vehicle occupant, the door 162a rotates upward, the door 162b rotates leftward, and the door 162c rotates rightward during deployment of the airbag. Other embodiments have different door arrangements. For example, in some embodiments, one door opens downward, another opens rightward, and another opens leftward. In other embodiments, a first door rotates upward and a second door rotates downward. In still other embodiments, four doors open upward, downward, rightward, and leftward, respectively. Any suitable number of doors and opening arrangements are contemplated.

As further discussed below with respect to FIG. 4, at least a portion of the one or more tear seams 160 may be disposed along a line of connection, which may also be referred to as a connection line or adjoining line, between the panel 150 and one or more sidewalls 152. In some embodiments, the panel 150 may be formed as a single hinged door, which may, for example, rotate about a hinge at the top, bottom, or either lateral side of the cover 102. In other embodiments, the panel 150 may be formed as two hinged doors. Any suitable number of doors that may opened to permit egress of the airbag 110 is contemplated, as is any suitable opening pattern.

As will be discussed in greater detail below, the sidewalls 152 can extend from the panel 150 substantially forward relative to the vehicle and away from an occupant of the vehicle (e.g., deeper into the steering wheel 12, toward the steering column 14). The one or more sidewalls 152 may be configured to engage the housing 114 of the airbag assembly 100. The one or more sidewalls 152 may encompass or substantially encompass at least a portion of the unexpanded airbag 110, as shown in FIG. 1A.

FIG. 2 is an exploded perspective view of the airbag cover 102 and the housing 114 in an uncoupled state. As previously discussed, the housing 114 can be mounted in a vehicle, such as in the steering wheel of the vehicle. The airbag cover 102 is configured to engage with the housing 114 to enclose an airbag 110 in an unexpanded state, as shown in FIG. 1A and described above with reference to the same.

The housing 114 can include one or more sidewalls 170 that cooperate to define a cavity 176 into which the airbag 110 can be received in an undeployed state. In the illustrated embodiment, a single sidewall encompasses the cavity 176 and extends upwardly (in the illustrated orientation) from a base 173. Typically, the airbag 110 is rolled, folded, or otherwise compacted in some fashion for insertion into the cavity 176 when in the undeployed state. The housing 114 can define an opening 175 opposite the base 173 through which the airbag 110 is deployed. The opening 175 thus may also be referred to herein as the egress opening 175.

Figure 3:
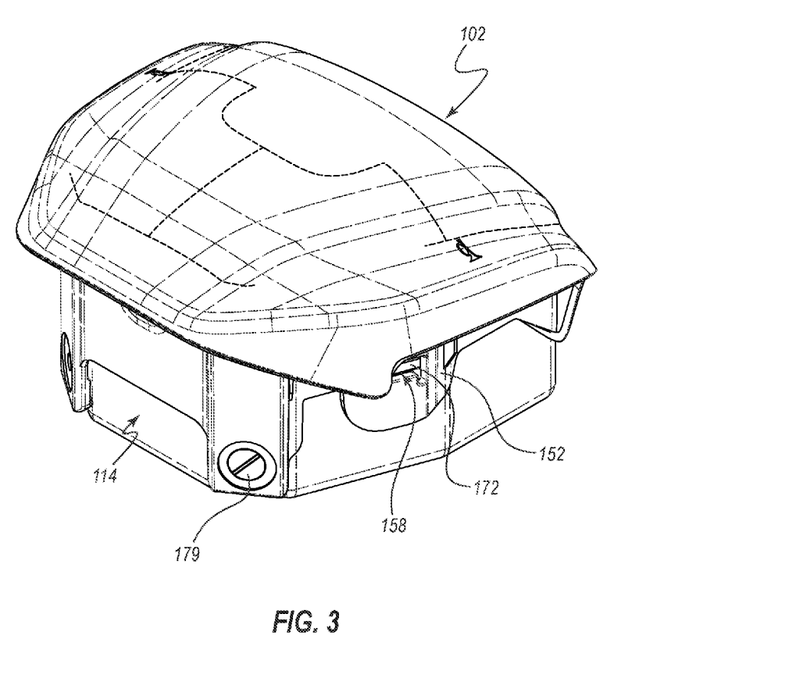
FIG. 3 is a perspective view of the airbag cover and the housing in an attached configuration with the airbag cover in an undeployed state.

The housing 114 can define one or more features for coupling with the airbag cover 102. In the illustrated embodiment, the sidewall 170 of the housing includes a tab 172 that extends outwardly. As shown by comparison of FIG. 2 to FIG. 3, the tab 172 is sized and shaped to be received within a slot 158 defined by a sidewall 152 of the airbag cover 102. As shown in FIGS. 2-4, as with the illustrated housing 114, the illustrated airbag cover 102 includes a single sidewall 152. The sidewall 152 is substantially shaped as a hoop and encompasses an entirety of an upper portion (in the orientation illustrated in FIGS. 2 and 3) of the housing 170 when the airbag cover 102 is coupled to the housing 114. Energy can be readily distributed from one portion of the sidewall 152 to another portion during a deployment event due to such an arrangement. As previously mentioned, other sidewall configurations are contemplated for the sidewall 152, such as multiple individual sidewalls of which at least one are configured to couple with the housing 114. FIG. 4 shows that the airbag cover 102 defines two slots 158 for engaging with two tabs 172 that extend outwardly in opposite directions from the housing 114. Although not depicted in the drawings, additional tabs 172 and slots 158 may be present for coupling the airbag cover 102 to the housing 114.

As shown in FIGS. 2 and 3, the illustrated housing 114 further defines openings 174 through which fasteners 179 may be received. The airbag cover 102 similarly defines openings 157 that align with the openings 174 to permit passage of the fasteners 179. In other embodiments, the openings and fasteners are omitted.

With reference to FIG. 2, the panel 150 of the airbag cover 102 may define an "A" surface of the airbag cover 102 that is configured to face an occupant of a vehicle in which the airbag cover 102 is installed. The panel 150 is configured to open during deployment of the airbag 110 disposed within the housing 114 and enclosed by the panel 150. That is, the panel 150 can span or extend over the opening 175 of the housing 114 to effectively close the opening 175. As the airbag 110 expands within the cavity 176, the airbag 110 pushes against the panel 150 to achieve egress from the cavity 176. As can be appreciated from FIGS. 1A-4, an exterior surface of the airbag cover 102 defines the "A" surface; an interior surface of the airbag cover 102 (depicted in FIG. 4) faces the airbag 110 in the undeployed state. An interior face of the sidewall 152 of the airbag is directed toward the airbag during at least a portion of a deployment event. In some instances, depending on how much of the cavity 176 is filled by the undeployed airbag 110, the entire interior face of the sidewall 152 faces toward the airbag 110 when the airbag 110 is in the undeployed state and throughout deployment of the airbag 110.

The one or more sidewalls 152 extend from an underside, enclosing side, or interior surface of the panel 150. As previously mentioned, in the illustrated embodiment, the airbag cover 102 includes a single sidewall 152 configured to extend around an exterior surface of the housing 114, as depicted in FIG. 3. The sidewall 152 encompasses the egress opening 175 (see FIG. 2) of the housing 114 when the airbag cover 102 is coupled to the housing 114 (see FIG. 3). In other embodiments, the airbag cover 102 can have multiple individual sidewalls 152, which may cooperate to encompass or substantially encompass the egress opening 175 of the housing 114. When the airbag cover 102 is installed in a vehicle, the sidewall 152 extends from the panel 150 in a generally forward direction (relative to the direction of the vehicle), away from an occupant (e.g., driver) of the vehicle. In other words, the sidewall 152 extends into the steering wheel, toward the steering column. The sidewall 152 can be oriented substantially transversely relative to the panel 150. For example, in some embodiments, the sidewall 152 is joined to the panel 150 in a substantially perpendicular fashion, or at an angle between about 60 degrees to about 120 degrees. As can be appreciated, the one or more sidewalls 152 may include any number of sides and may be arranged in any suitable variety of shapes (e.g., triangular, rectangular, pentagonal, hexagonal, etc.). The shape may be complementary to the shape defined by the walls 170 of the housing 114.

The one or more tear seams 160 of the airbag cover 102 are configured to tear, split, break, and/or otherwise separate to allow release or deployment of the airbag 110 as it expands. In the illustrated embodiment, the tear seam 160 is substantially continuous, and thus may be considered a single tear seam 160 with multiple joined sections. Conversely, each section may be considered a separate tear seam 160. In the illustrated embodiment, the tear seam 160 includes two substantially transverse sections (or each of the transverse sections may be considered a separate tear seam) at the lower end and across the middle of the panel 150. The tear seam 160 further includes three substantially vertical sections (or three separate substantially vertical tear seams) at the left, right, and center regions of the panel 150, as would be viewed by a vehicle passenger in the steering wheel orientation depicted in FIG. 1A. The tear seam 160, may be formed as a groove, channel, perforated line, or any other suitable weakened feature in the material of which the airbag cover 102 is formed. A thickness of the cover 102 material can be reduced along the tear seam 160 (and in some instances, such as in some perforated arrangements, portions of the material may be eliminated), which can permit the tear seam 160 to rupture as the airbag 110 is deployed. In the illustrated embodiment, the tear seam 160 is substantially a V-shaped groove of reduced material thickness, as shown in FIG. 4. The illustrated tear seam 160 is formed at the interior side of the panel 150.

Figure 4:
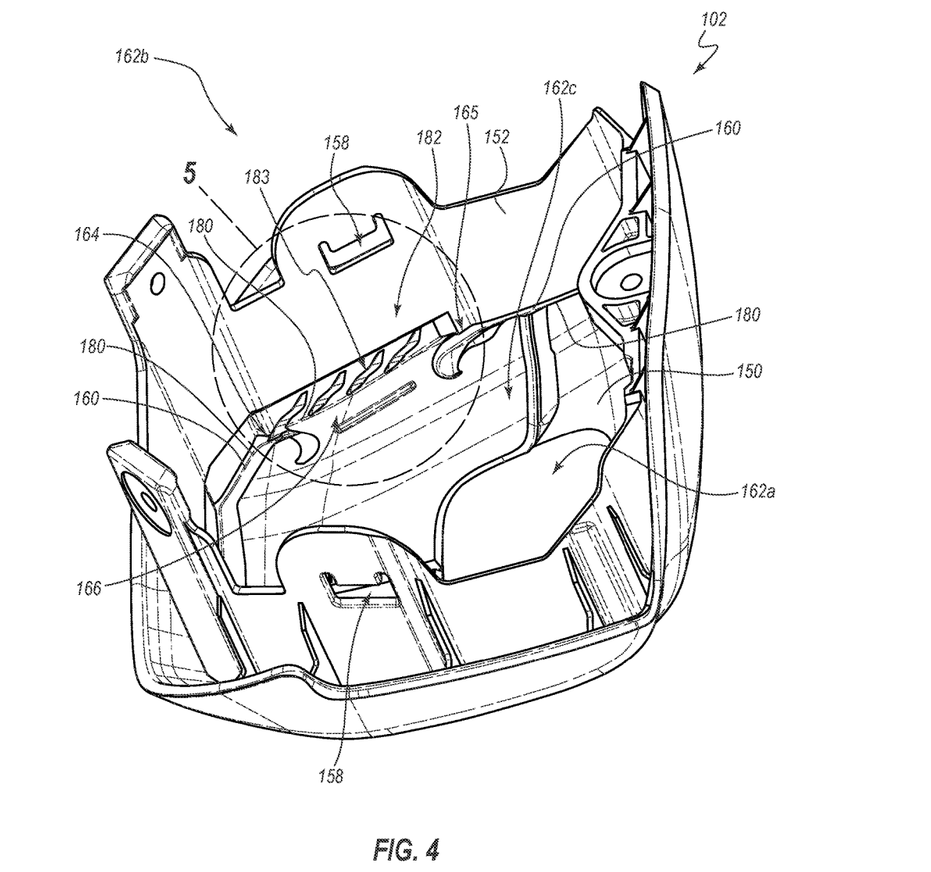
FIG. 4 is an opposing perspective view of the airbag cover depicting a portion of an internal surface of thereof.
Figure 5:
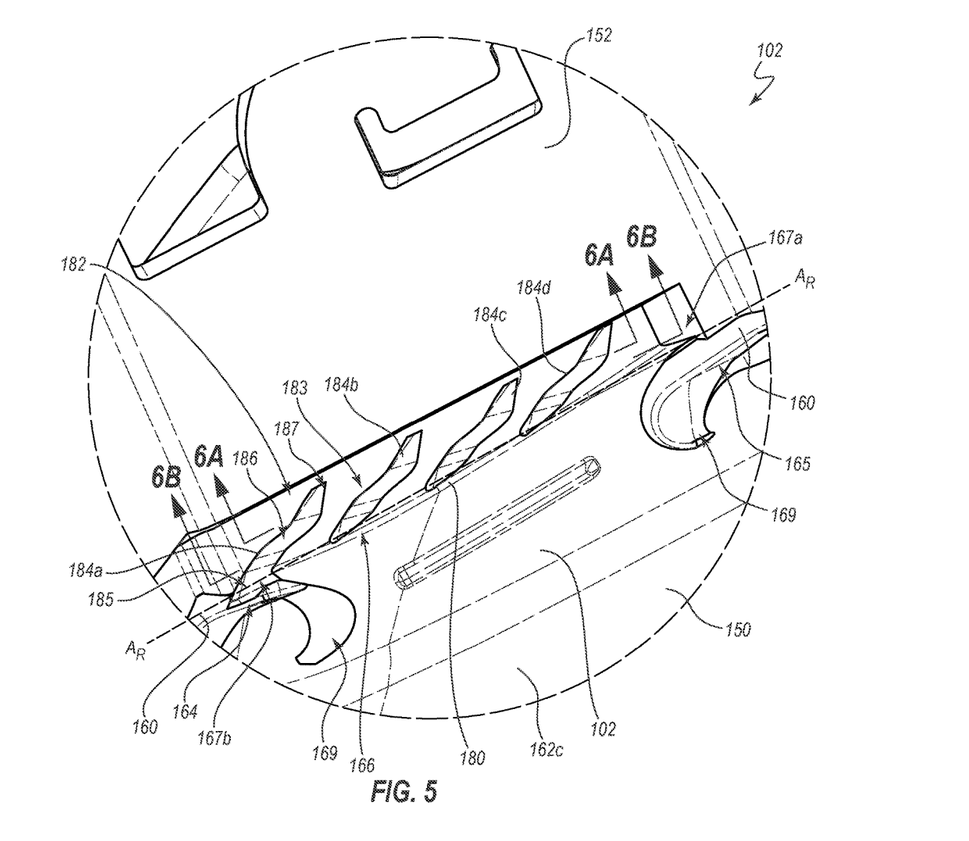
FIG. 5 is an enlarged perspective view of an internal surface of the airbag cover taken along the view line 5 in FIG. 4.
Figure 8:
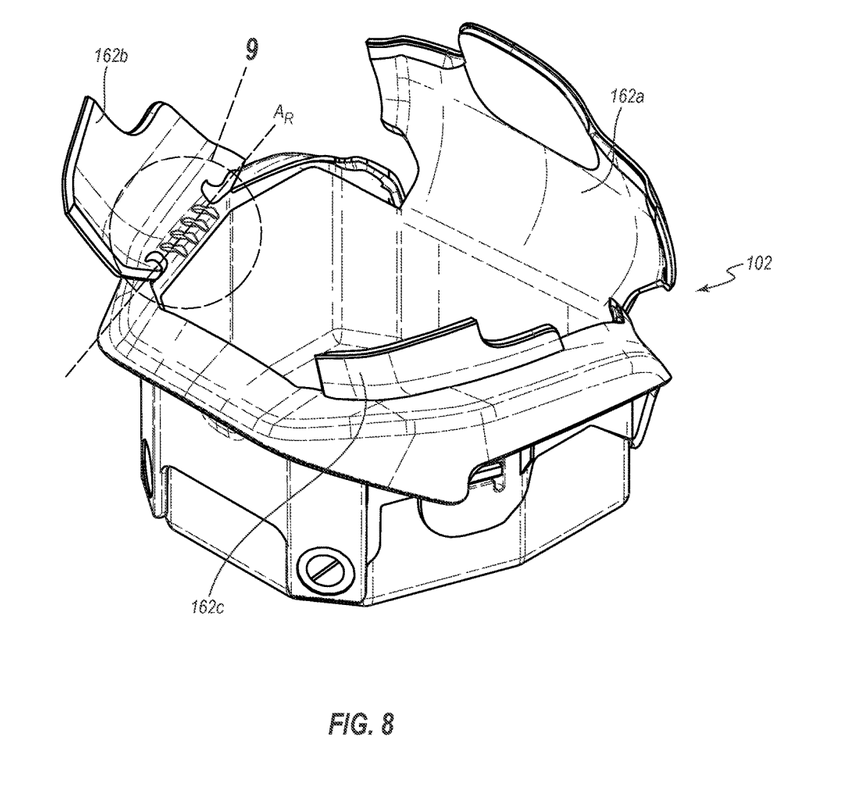
FIG. 8 is a perspective view of the airbag cover and the housing of FIG. 3 in an attached configuration with the airbag cover in a deployed state.

With reference to FIGS. 3 and 4, portions of the illustrated tear seam 160 are disposed at or near an adjoining line 180, which may also be referred to as a connection line or connection region, along which the panel 150 is joined to the sidewall 152. The tear seam 160 can terminate at ends 164, 165, as shown in FIGS. 2 and 5. A region between the ends 164, 165 can define a hinge 166 about which a portion of the panel 150 can rotate during deployment of the airbag, as shown in FIGS. 2, 4, and 5. In the illustrated embodiment, rupture of the tear seam 160 forms the three hinged doors 162a, 162b, 162c that rotate to permit egress of the airbag 110, as shown in FIGS. 1B, 2, and 8. In the illustrated embodiment, the front covering tear seams 160 are formed in an underside or enclosure side of the panel 150, such that the panel 150 tears to hinge open, as shown in FIGS. 4, 5, and 8. The adjoining line 180 can extend continuously along the tear seam 160, through the ends 164, 165, and through the hinge 166. Stated otherwise, the hinge 166 may be positioned along the adjoining line 180. As shown in FIG. 5, the hinge 166 may terminate at opposing ends 167a, 167b that coincide with the ends 165, 164 of the tear seam 160.

As shown in FIGS. 4 and 5, a stress-relief region 182 can be positioned laterally adjacent to the hinge 166. The positioning is described as "laterally adjacent," inasmuch as the hinge 166 substantially extends in a longitudinal direction and the stress-relief region 182 extends transversely away from the hinge 166. Stated otherwise, the stress-relief region 182 is adjacent to the hinge 166 and extends substantially parallel thereto along at least a portion of the longitudinal length of the hinge 166. In the illustrated embodiment, the stress-relief region 182 is defined in the sidewall 182. The stress-relief region 182 is at a region of reduced thickness of the sidewall 152. In the illustrated embodiment, it may be said that the stress-relief region 182 extends laterally from the hinge 166—in a substantially upward and leftward direction in the view depicted in FIG. 5—toward a thicker portion of the sidewall 162.

As further discussed below, the stress-relief region 182 is configured to flex as the door 162c rotates about the hinge 166 to inhibit the door 162c from separating from the sidewall 162 during deployment of the airbag 110. Such flexion can dissipate energy that otherwise might cause propagation of the tear seam 160 to extend beyond one or more of the ends 164, 165 and continue through the hinge 166. The stress-relief region 182 can be configured to direct energy away from the hinge 166 and into the sidewall 152.

Figure 6A:
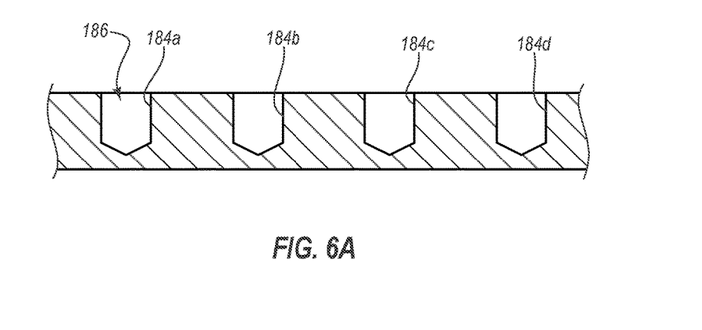
FIG. 6A is a cross-sectional view of the airbag cover in an undeployed state taken along the view line 6A-6A in FIG. 5.
Figure 6B:
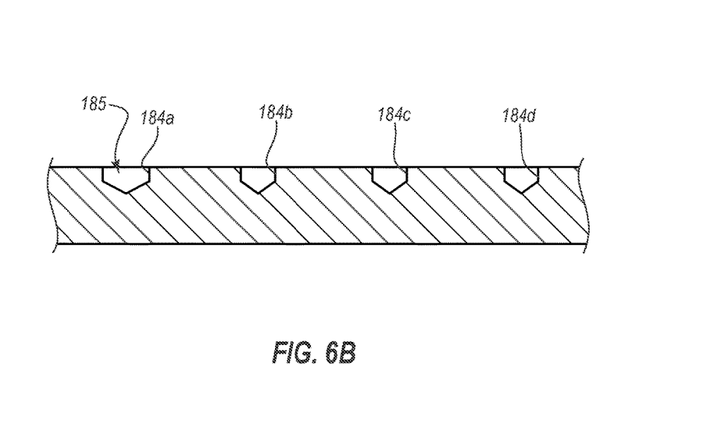
FIG. 6B is a cross-sectional view of the airbag cover in an undeployed state taken along the view line 6B-6B in FIG. 5.

The stress-relief region 182 can include one or more weakened features 183 that are disposed in the sidewall 152. The weakened features 183 can be configured to flex, rupture, burst, and or otherwise absorb or redirect energy. With reference to FIG. 5, in the illustrated embodiment, the weakened features 183 comprise a plurality of grooves 184a, 184b, 184c, 184d. As shown in FIGS. 5, 6A, and 6B, the grooves 184a, 184b, 184c, 184d extend into the sidewall 152 to reduce a thickness of the sidewall 152 thereat. The illustrated grooves 184a, 184b, 184c, 184d, however, do not extend through a full thickness of the sidewall 152. The grooves 184a, 184b, 184c, 184d can facilitate bending of the sidewall 152 in the stress-relief region 182. One or more of the grooves 184a, 184b, 184c, 184d may burst during a deployment event, which can relieve strain on the hinge 166.

Figure 7A:
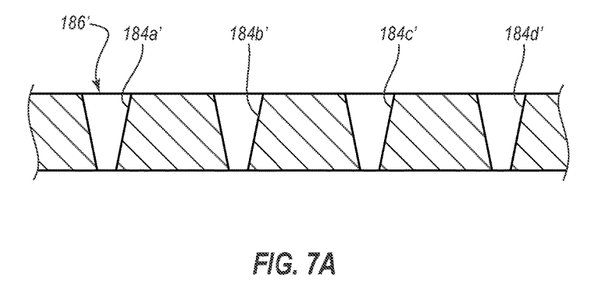
FIG. 7A is a cross-sectional view of another embodiment of an airbag cover in an undeployed state depicting a view such as that of FIG. 6A.
Figure 7B:
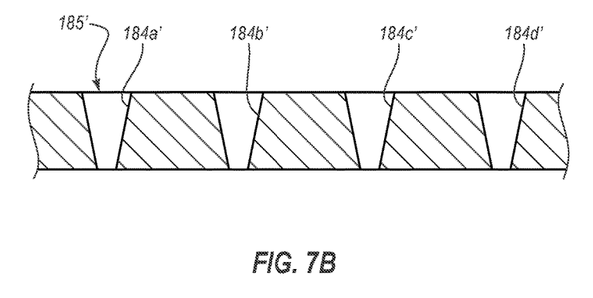
FIG. 7B is a cross-sectional view of the airbag cover of FIG. 7A in an undeployed state depicting a view such as that of FIG. 6B.

With reference to FIGS. 7A and 7B, in other embodiments, at least a portion of one or more of the grooves 184a, 184b, 184c, 184d can extend through a full thickness of the sidewall 152. For example, in some embodiments, one or more of the grooves 184a, 184b, 184c, 184d may be formed of a perforated line in the sidewall material. In such embodiments, the views depicted in FIGS. 7A and 7B represent a cross-sectional plane extending through individual perforations. In other embodiments, one or more of the grooves 184a, 184b, 184c, 184d may be replaced with slits, which may be cuts or pre-formed gaps in the material of the sidewall 152. The stress relief slits may function substantially the same as the grooves 184a, 184b, 184c, 184d, except that rupturing thereof may not occur during deployment. Rather, the stress relief slits may open or expand in response excess deployment energy to direct such energy toward a desired portion of the airbag cover 102.

With reference again to FIG. 5, the grooves 184a, 184b, 184c, 184d in the illustrated embodiment are each shaped substantially as an elongated S. As with all of the grooves of the illustrated embodiment, the groove 184a includes a proximal end region 185, a middle region 186, and a distal end region 187. A cross-sectional profile of each groove can change along a length thereof. For example, as shown in FIG. 6A, in the illustrated embodiment, each groove 184a, 184b, 184c, 184d is relatively deep and wide in the middle region 186. However, each groove 184a, 184b, 184c, 184d is relatively shallower and narrower in the proximal end region 185. Although not depicted in the drawings, the distal end region 187 can also be shallower and narrower (such that a cross-sectional view of this region would resemble the view depicted in FIG. 6B).

For each of grooves 184b, 184c, 184d, the proximal end region 185 starts at a point substantially at the adjoining line 180 at an interior surface of the sidewall 152 and widens and deepens toward the middle region 186. A width and a depth of the grooves 184b, 184c, 184d is substantially constant through the middle region 186. The grooves 184b, 184c, 184d then become shallower and again narrow to a terminal point in the distal end region 187.

The groove 184a is substantially the same as the grooves 184b, 184c, 184d, except that the proximal end region 185 thereof is wider, as shown in FIGS. 5 and 6B. The proximal tip of the end region 185 substantially defines an opening or a region of reduced thickness that coincides with the end 167b of the hinge 166. Such an arrangement can assist in redirecting energy away from the adjoining line 180 and into the sidewall 152.

For example, during deployment, the tear seam 160 can rupture at a position at the left and outside of the view illustrated in FIG. 5, and can propagate toward the end 164 of the tear seam 160. The tear seam 160 thus tears along the adjoining line 180 in a propagation direction toward the terminal end 167b of the hinge 166, which coincides with the end 164 of the tear seam 160. In the absence of the groove 184a and/or the stress-relief region 182, in some instances, this tearing could continue through the ends 164, 167b of the tears seam 160 and the hinge 166, respectively, and proceed along the adjoining line 180 within the hinge region. That is, the propagation direction continues along the adjoining line 180. Tearing that continues through an entirety of the hinge 166 can result in the door 162c undesirably breaking away from the rest of the airbag cover 102. The groove 184a can instead redirect the tearing away from propagation direction (e.g., along the adjoining line 180) and into the sidewall 152. In some instances, the open (e.g., widened with reduced material thickness) proximal end 185 of the groove 184a can facilitate this redirection. The open end 185 can readily rupture and channel energy toward the distal end 187 of the groove 184a. Other or further manners in which the stress-relief region 182 redistributes energy during deployment are discussed further below.

In the illustrated embodiment, the panel 150 can define curved grooves 169 at either end 164, 165 of the tear seam 160 to similarly dissipate energy into the panel 150. At the end 164 of the tear seam, the grooves 184a, 169 each define acute angles relative to the adjoining line 180. One component of each of these angles are collinear and extend in the propagation direction along which the tear seam is separated during deployment, while other components extend away from the adjoining line 180 in different planes that intersect along the adjoining line (again, in the illustrated embodiment, the sidewall 152 and the cover 150 meet each other at an angle, which may be substantially orthogonal).

For each of the illustrated grooves 184a, 184b, 184c, 184d, the proximal end region 185 is oriented at an acute angle relative to the adjoining line 180. It may also be said that the end regions 185 of the grooves are oriented at an acute angle relative to a rotational axis $A_R$ defined by the hinge 166. As discussed further below, the door 162c rotates about the rotational axis $A_R$ during deployment of the airbag (see FIGS. 8 and 9). The end regions 185 can direct stress away from the rotational axis $A_R$ and toward the proximal end regions 187 during such rotation.

For each of the illustrated grooves 184a, 184b, 184c, 184d, the middle region 186 either defines a shallower angle relative to the adjoining line 180 (or to the rotational axis $A_R$), as compared with the angle defined by the proximal end region 185, or may be substantially parallel to the adjoining line 180. For example, in the illustrated embodiment, the middle regions 186 of the grooves 184a, 184b, 184c, 184d substantially define a "dashed line" of alternating regions of full material thickness and reduced material thickness, and this line extends substantially parallel to the adjoining line 180 (or to the rotational axis $A_R$). As previously discussed, the material thickness of the sidewall 152 is greatly reduced (e.g., is at either a minimum or a local minimum) at the middle regions 186. During deployment, one or more of the middle regions 186 can readily burst and flex to relieve stress that might otherwise cause the hinge 166 to tear. Flexion of the middle regions 186 can effectively distribute the stresses that arise in the rotational axis $A_R$ over a larger area. The middle regions 186 can dissipate some of those stresses through rupture and, in some instances, flexion about an additional axis (i.e., the "dashed line" defined by the middle regions 186) that runs substantially parallel to the rotational axis $A_R$ defined by the hinge 166.

For each of the illustrated grooves 184a, 184b, 184c, 184d, the distal end region 187 defines a larger angle relative to the adjoining line 180 (or to the rotational axis $A_R$), as compared with the middle region 186. Such an arrangement may assist in directing energy away from the hinge 166 and toward portions of the sidewall 152 that are spaced form the adjoining line 180. For example, in the illustrated embodiment, the more steeply angled distal end regions 187 point toward a thicker portion of the sidewall 152. The end regions 187 can direct energy in the direction they are pointed. At least some of the redirected energy can be dissipated in the thicker region of the sidewall 152.

In other embodiments, one or more of the weakened features 183 can be configured differently than the grooves 184a, 184b, 184c, 184d. For example, as previously mentioned, one or more slits or perforated lines may be used in place of one or more of the grooves 184a, 184b, 184c, 184d. In some instances, a series of holes, recesses, divots, or other thickness reducing features are used. In other or further embodiments, one or more of the weakened features 183 can define a profile that differs from the elongated S shape of the illustrated grooves. For example, the features 183 can be more curvilinear and/or may be discontinuous.

In some embodiments, the weakened features 183 extend in opposite directions to alleviate stresses at either end 167a, 167b of the hinge 166. For example, in some embodiments, the groove 184d has a widened proximal end region 185, such as that depicted with respect to the groove 184a, that coincides with the end 167a of the hinge 166. The grooves 184d, 184c angle upwardly from the adjoining line 180 in the opposite direction to the grooves 184a, 184b, such that the two sets of grooves extend toward each other. The groove 184d in such an arrangement can be particularly useful in redirecting propagation of a tear along the tear seam 160 into the sidewall 152 from an opposite propagation direction—namely, from rightward position (outside of the field of view in FIG. 5) and toward the end 167a of the hinge 166. Any other suitable arrangement, configuration, profile, and/or number of the weakened features 183 is contemplated.

With continued reference to FIG. 5, the adjoining line 180 can be somewhat curved in the region of the hinge 166. This curve is apparent by comparing the adjoining line 180 to the rectilinear axis of rotation $A_R$. The curvature is due to a curvature of the panel 150 in the vicinity of the hinge 166, as can also be seen in FIGS. 2-4 and 8. The curvature of the adjoining line 180 in the region of the hinge 166 can increase stresses during deployment, in some instances. For example, with continued reference to FIG. 5, as the door 162c rotates during deployment, it will tend to rotate about the linear rotational axis $A_R$ which is offset relative to the adjoining line 180. The resulting stress can tend to cause splitting along the adjoining line 180. The presence of the stress-relief region 182 in this area relieves this stress in manners previously described (e.g., rupture, flexion, redirection) to inhibit splitting along the adjoining line 180.

FIGS. 8-10B depict the airbag cover 102 after deployment. The deployed airbag 110 is omitted from the drawing for purposes of clarity. These drawings show another stress-relief region associated with the door 162b, which is positioned opposite the door 162a previously discussed with respect to FIGS. 4 and 5. The stress-relief region is substantially the same as the stress-relief region 182 and includes grooves 184e, 184f, 184g, 184h. In the illustrated embodiment, these grooves are identical the grooves 184a, 184b, 184c, 184d, and thus they are configured to function in manners such as discussed above, including redirecting energy from the axis of rotation $A_R$ to the sidewall 152.

A comparison of FIGS. 10A and 10B to FIGS. 6A and 6B, respectively, demonstrates that various portions of the grooves 184e, 184f, 184g, 184h rupture during deployment. In particular, the middle regions of the grooves 184e, 184f ruptured in the illustrated deployment event. Likewise, the proximal region 185 of the groove 184e ruptured during deployment.

Figure 9:
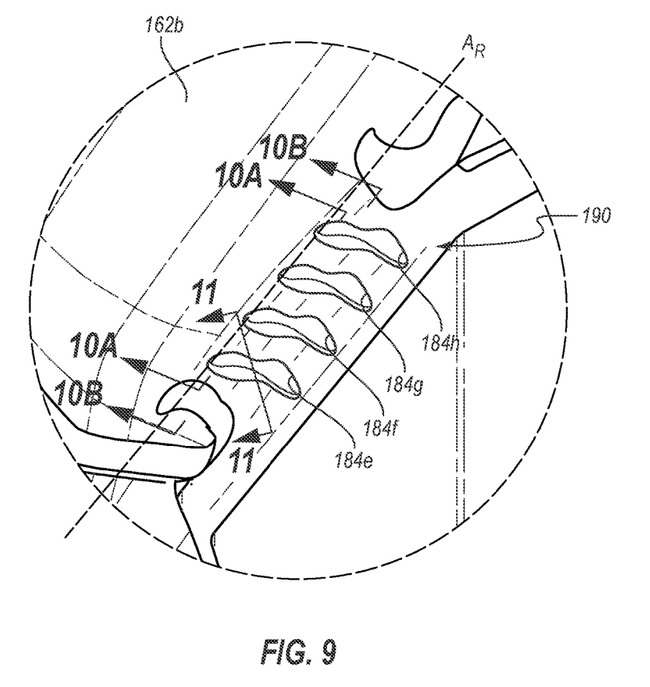
FIG. 9 is an enlarged perspective view of an internal surface of the deployed airbag cover taken along the view line 9 in FIG. 8.
Figure 10A:
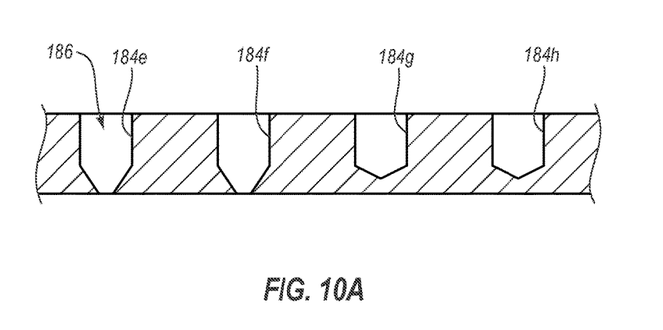
FIG. 10A is a cross-sectional view of the deployed airbag cover of FIG. 8 taken along the view line 10A-10A in FIG. 9.
Figure 10B:
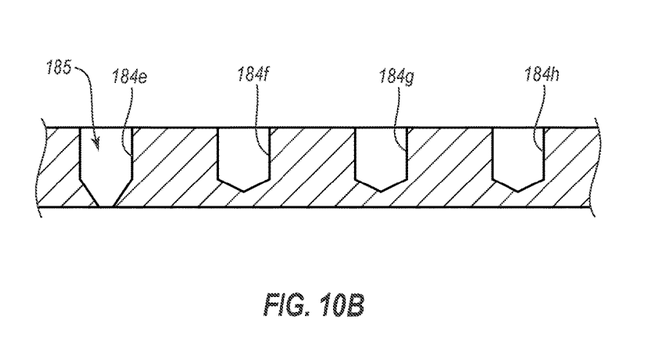
FIG. 10B is a cross-sectional view of the deployed airbag cover of FIG. 8 taken along the view line 10B-10B in FIG. 9.
Figure 11:
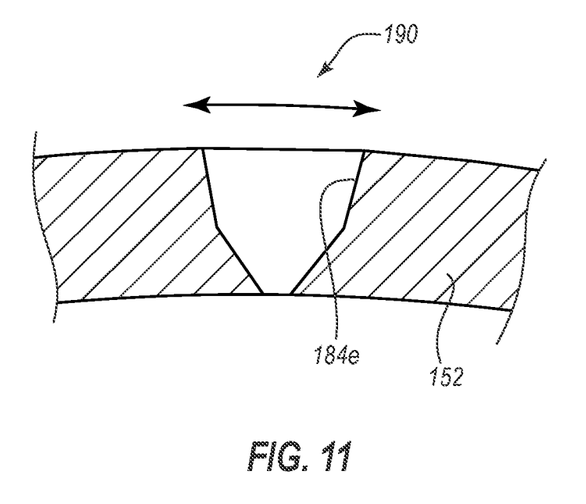
FIG. 11 is a cross-sectional view of the airbag cover of FIG. 8 similar to the view depicted in FIG. 10A that represents an instant during deployment of the airbag.

As shown in FIGS. 9 and 11, the grooves 184e, 184f, 184g, 184h define an expansion region 190 in the vicinity of the axis of rotation $A_R$. The manner in which the expansion region 190 expands during deployment is depicted in FIG. 11, which is a cross-sectional view of the airbag cover 102 taken along the view line 11-11 in FIG. 9 during the deployment. As depicted by the double-headed arrow in FIG. 11, the portions of the interior face of the sidewall 152 adjacent to the grooves (e.g., the groove 184e), separate from each other during deployment. Stated otherwise, the interior face of the sidewall expands during deployment. This expansion aids in relieving stresses, in manners previously discussed.

It will be obvious to those having skill in the art that many changes may be made to the details of the above-described embodiments without departing from the underlying principles of the invention. The scope of the present invention should, therefore, be determined only by the claims that follow.

The invention claimed is:

1. An airbag cover comprising:
   a sidewall configured to couple the airbag cover with a housing of an airbag assembly;
   a panel adjoined to the sidewall at a hinge, the panel being configured to cover at least a portion of an opening defined by the housing through which an airbag positioned in the housing is deployable when the airbag cover is coupled to the housing;
   one or more tear seams that are breakable by the airbag as the airbag is deployed to form at least a portion of the panel into a door that rotates about the hinge to permit egress of the airbag; and
   a stress-relief region in the sidewall that is laterally adjacent to the hinge, the stress-relief region being configured to flex as the door rotates about the hinge to inhibit the door from separating from the sidewall during deployment of the airbag, wherein the stress-relief region comprises a plurality of weakened features disposed in the sidewall, each of the plurality of weakened features comprising:

a proximal region oriented at an acute angle relative to a rotational axis of the hinge, a middle region oriented at a shallower angle relative to the rotational axis of the hinge than the proximal region, and a distal region oriented at a larger angle relative to the rotational axis of the hinge than the middle region.

2. The airbag cover of claim 1, wherein at least one end of the one or more tear seams terminates at the hinge.

3. The airbag cover of claim 2, wherein the hinge terminates at first and second ends and wherein two separate ends of the one or more tear seams terminate at the first and second ends of the hinge.

4. The airbag cover of claim 1, wherein one or more of the weakened features are configured to rupture during deployment of the airbag.

5. The airbag cover of claim 1, wherein the weakened features comprise a plurality of grooves.

6. The airbag cover of claim 5, wherein each of the grooves defines a region in which a thickness of the sidewall is reduced but does not extend fully through the sidewall.

7. The airbag cover of claim 5, wherein one or more of the grooves are configured to rupture as the door rotates about the hinge during deployment of the airbag.

8. The airbag cover of claim 5, wherein the proximal region, middle region, and distal region define a profile shaped substantially as an elongated S.

9. The airbag cover of claim 5, wherein an end of the one or more tear seams terminates at the hinge such that the tear seam opens in a propagation direction that extends toward the hinge, and wherein the proximal region of each of the plurality of grooves is oriented at an acute angle relative to the propagation direction.

10. The airbag cover of claim 5, wherein an end of the one or more tear seams terminates at the hinge, wherein one of the grooves has a first end that is at or adjacent to the end of the one or more tear seams and has a second end that is distanced from the hinge, and wherein said one of the grooves is configured to rupture to redirect energy from the hinge into the sidewall.

11. The airbag cover of claim 5, wherein each of the plurality of grooves comprises a first end at the hinge and a second end positioned in the sidewall at a distance from the hinge, each groove extending from the first end to the second end.

12. The airbag cover of claim 1, wherein the hinge is curved when the airbag cover is in an undeployed state, and wherein flexion of the stress-relief region relieves stress in the hinge as the door rotates about the hinge.

13. The airbag cover of claim 1, wherein a unitary molded piece defines each of the sidewall, the panel, the hinge, the one or more tear seams, and the stress-relief region.

14. An airbag cover configured to couple with a housing portion of an assembly that comprises an airbag, the airbag cover comprising:

a sidewall that comprises an interior face directed toward the airbag during deployment of the airbag;

a panel that adjoins the sidewall at a hinge;

one or more tear seams that are breakable by the airbag as the airbag is deployed to form at least a portion of the panel into a door that rotates about the hinge to permit egress of the airbag; and an expansion region at the interior face of the sidewall that is configured to expand as the door rotates about the hinge to relieve stress in the hinge, wherein the expansion region comprises a plurality of weakened features, at least one of the weakened features is disposed in the sidewall and comprises:

a proximal region oriented at an acute angle relative to a rotational axis of the hinge, a middle region oriented at a shallower angle relative to the rotational axis of the hinge than the proximal region, and a distal region oriented at a larger angle relative to the rotational axis of the hinge.

15. The airbag cover of claim 14, wherein the plurality of weakened features comprise a plurality of grooves.

16. The airbag cover of claim 15, wherein the grooves extend through only a portion of a thickness of the sidewall.

17. The airbag cover of claim 15, wherein one or more of the grooves are configured to rupture to relieve stress in the hinge.

18. The airbag cover of claim 14, wherein a connection line at which the panel adjoins the sidewall extends through at least a first end of the hinge, wherein the at least one tear seam extends along at least a portion of the connection line and terminates at the first end of the hinge.

19. The airbag cover of claim 18, wherein the connection line extends through a second end of the hinge, and wherein the at least one tear seam terminates at the second end of the hinge.

20. The airbag cover of claim 14, wherein each of the plurality of grooves comprises a substantially rectilinear region that is spaced from the hinge and runs substantially parallel to a rotational axis about which the panel rotates during deployment of the airbag.

21. An airbag cover configured to couple with a housing portion of an assembly that comprises an airbag, the airbag cover comprising:

a panel;

a sidewall configured to couple the panel with the housing, the sidewall being adjoined to the panel along an adjoining line that includes a hinge;

a tear seam of which at least a portion extends along the adjoining line, the tear seam being breakable during deployment of the airbag to form or assist in forming at least a portion of the panel into a door that rotates about the hinge to permit egress of the airbag, the tear seam comprising an end that terminates at the hinge; and a weakened feature in the sidewall that comprises a first region at or adjacent to the end of the tear seam oriented at an acute angle relative to a rotational axis of the hinge, a second region oriented at a shallower angle relative to the rotational axis of the hinge than the proximal region, and a third region that is distanced from the hinge and oriented at a larger angle relative to the rotational axis of the hinge than the middle region, wherein the weakened feature is configured to rupture to redirect energy from the hinge into the sidewall.

22. The airbag cover of claim 21, wherein the weakened feature comprises a groove.

23. The airbag cover of claim 1, wherein the middle region is configured to rupture during deployment of the airbag.

24. The airbag cover of claim 1, wherein the distal region is configured to direct energy away from the hinge.

* * * * *